Jan. 12, 1932.  F. M. GUY  1,840,714
UNIVERSAL JOINT
Filed June 20, 1928    2 Sheets-Sheet 2
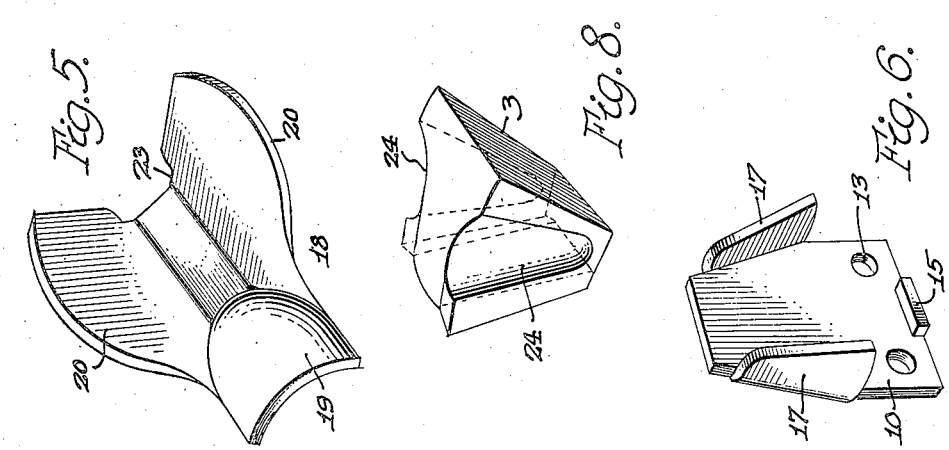
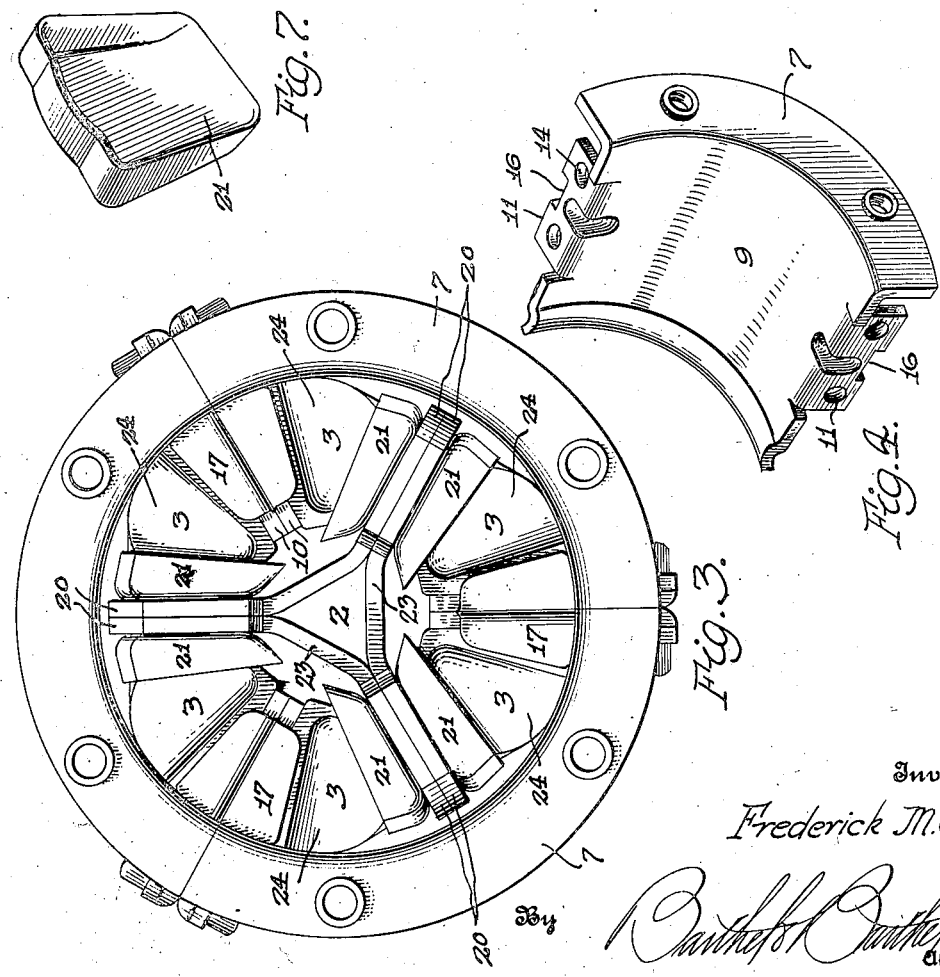
Inventor
Frederick M. Guy,
By
Attorneys Patented Jan. 12, 1932

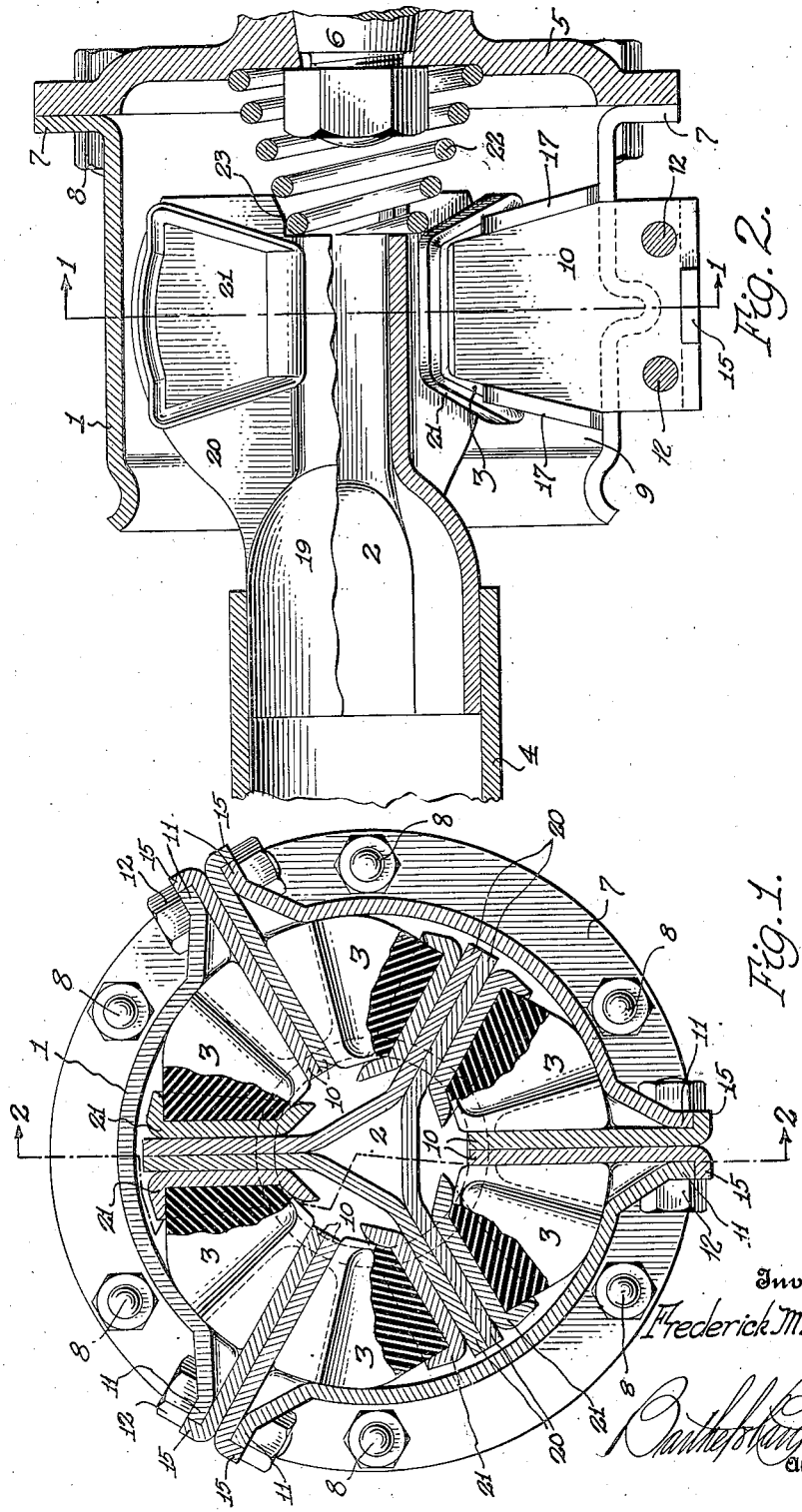

1,840,714

UNITED STATES PATENT OFFICE

FREDERICK M. GUY, OF DETROIT, MICHIGAN, ASSIGNOR OF ONE-HALF TO TREVOE G. MURTON, OF DETROIT, MICHIGAN

UNIVERSAL JOINT

Application filed June 20, 1928. Serial No. 286,847.

This invention relates to a universal joint, and more particularly to improvements in universal joints of the type disclosed in my application, Serial Number 263,262, filed March 21, 1928. In the construction shown in this application relative longitudinal movement between driving and driven members of said joint is resisted by the yieldable non-metallic members employed to connect said driving and driven members, and more or less additional strain and flexing of these connecting members is placed thereon by such longitudinal movement or thrust of the driven member.

An object of the present invention is to relieve the yieldable non-metallic members of the construction from all twisting strains or flexure, due to end thrust and consequent relative longitudinal movement between driving and driven members, and further, to eliminate abrasion and friction due to relative movement of the parts, which friction would tend to generate heat, with consequent ultimate disintegration of these non-metallic members. It is also an object to provide other new and useful features in the construction and arrangement of parts.

With the above and other ends in view, the invention consists in the matters hereinafter set forth and more particularly pointed out in the appended claims, reference being had to the accompanying drawings in which Figure 1 is a transverse section substantially upon the line 1—1 of Figure 2 of a device illustrative of an embodiment of the present invention;

Figure 2 is a longitudinal section substantially upon the line 2—2 of Figure 1;

Figure 3 is an end elevation of the joint disconnected from the driving disk to which it is attached when in operative position;

Figure 4 is a perspective view of a casing segment;

Figure 5 is a perspective view of one of the segmental driving members.

Figure 6 is a perspective view of one of the members of an abutment on the casing;

Figure 7 is a perspective view of a shoe for a yieldable non-metallic block, and Figure 8 is a perspective view of a non-metallic block.

The present structure is designed to be formed principally of sheet metal stampings which are assembled to form an outer cylindrical casing indicated as a whole by the numeral 1, and an inner structure indicated as a whole by the numeral 2, the inner structure being centered within the casing by yieldable blocks 3 of rubber or other suitable material which form the driving connection between said casing and the inner structure to which inner structure the forward end of a tubular shaft 4 is secured when the structure is installed and permit lateral angular movement of said shaft relative to said casing, said casing being rigidly secured to a disk 5 which is in turn secured rigidly to the end of a driving shaft 6, said casing being formed with an outwardly extending annular end flange 7 by means of which said casing is secured to the peripheral edge portion of the disk 5 by series of bolts 8. The casing 1 therefore forms the driving member of the universal joint and to facilitate the formation and assembly of this casing, it is made up of a plurality of sheet metal segmental stampings 9, one of which is shown in perspective in Figure 4, these several segments together forming the complete cylindrical outer facing 1.

On the casing 1 is a series of inwardly extending abutments each adapted to project inwardly of the casing between two adjacent blocks 3 and thus cause these blocks to be carried by the casing when the casing is driven to transmit motion from the casing to the inner structure 2 of the universal joint. Each of these casing abutments comprises a pair of sheet metal stampings 10, one of which stampings is shown in perspective in Figure 6. These two stampings forming each abutment are placed back to back with their flat sides in contact with each other and the ends of the casing segments 9 are notched and the metal from the notch turned outwardly to form a flange 11 and the outer ends of the two plates 10 forming each abutment are secured between these flanges 11 on adjacent ends of the segments 9, said outer end portions of the plates fitting snugly within the notches in the segment ends and being secured between the flanges 11 by bolts 12 passing through holes 13 in the plates and like openings 14 in the flanges, said bolts thus serving not only to firmly secure the casing abutments to the casing but also to secure the casing segments together.

To further insure the firm and rigid attachment of the abutment plates 10 to the casing, each plate is formed with a lug 15 adapted to engage a notch 16 in the end edge of each of the flanges 11, and to embrace an adjacent block 3, each plate 10 is formed along its side edges of its inner end portion with integral flanges 17 bent substantially at right angles to the plate to engage the ends of the blocks 3, each block being seated upon each plate between the flanges 17. The inner or driven member of the universal joint is made up of a series of segmental parts or sections each of which is indicated as a whole and as shown in Figure 5, by the numeral 18. Each of these stampings 18 is formed with a segmental tubular end portion 19 which together form a tubular end for the inner member 2 when the stampings are assembled and these end portions are adapted when assembled to fit closely within the end of the tubular shaft 4, to which end they are rigidly and firmly secured in any suitable manner. Each section 18 is also formed with two wings 20, the outer edges of which are curved in the direction of their length and when the sections are assembled, the wings of one section lie flat against the wings of adjacent sections and the two wings of each pair of wings thus form an outwardly extending radial abutment on the inner member 2 of the universal joint, with these inner abutments interposed between adjacent blocks 3, which blocks are thus confined between the casing abutments 10 and these inner abutments 20 so that driving power applied to the casing 1 will be transmitted through the blocks to the inner abutments 20 and the inner member 2 of the universal joint which is rigidly secured to the driven shaft 4.

If the abutments 20 were formed to directly engage and hold the blocks 3, said blocks would then resist the longitudinal movement of the inner or driven member 2 relative to the casing 1 and such end thrust of the driven member come directly upon these rubber blocks, which would thus be put under a twisting strain and would be forced to flex in a direction longitudinally of the universal joint. To relieve these rubber inserts or blocks from such strain of resisting thrust of the driven member, each block is provided with a metal shoe 21 which is in the form of a cup as shown in Figure 7 and preferably, these shoes are formed of a metal known as self lubricating, that is, a metal which requires no additional lubrication to prevent friction between it and one of the abutments 20 which is formed of steel. There is one of these cup shaped shoes 21 for each of the blocks 3 and each shoe is shaped and cupped to receive one side of the block with the cup interposed between the block and the adjacent side of one of the abutments 20. The rubber blocks 3 do not therefore directly engage the inner abutments 20 on the driven member of the universal joint and therefore said inner member is free to slide longitudinally, the abutments 20 sliding with comparatively little friction between the shoes on the blocks 3. End thrust of the driven member is therefore not imparted to the rubber blocks but is taken by a coiled spring 22 which is interposed between the forward end of the inner member 2 and the driving disk 5, said driving disk being formed with a seat for one end of the spring and the forward ends of the segmental members 18 being each notched or cut away as at 23 to provide a seat for the rear end of the spring, said spring being preferably of the conical type with its end of least diameter seated in the seat 23.

As the abutments 10 on the casing extend radially inward therefrom and as the abutments 20 on the driven or inner member 2 extend radially outward between adjacent abutments 10 on the casing, the yieldable rubber blocks 3 are formed tapering or wedge shaped to fit the spaces between adjacent abutments and are placed in these spaces in the assembly of the structure under compression. They, therefore, exert an expansive force to hold the driven or inner member 2 centered within the casing 1 and the arrangement of alternating radial abutments also serve to center the driven member within the driving casing.

As the abutments 20 on the driven member are free to slide longitudinally of the casing between the shoes 21 on the blocks 3, the only strain to which the blocks will be subjected is the strain of transmitting the driving power from the casing 1 to the abutments 20 on the driven member and also the strain which is applied to these blocks when the driven member and shaft 4 are duplicated laterally out of axial alinement with the casing 1, as when this universal joint is embodied in a motor vehicle construction and serves to connect the movable or propeller shaft with the fixed or driving shaft and the rear end of the propeller shaft is moved vertically by its connection with the rear axle when the suspension springs which support the chassis on the rear axle, are flexed. When this out of alinement movement takes place, the yieldable non-metallic blocks 3 will yield sufficiently to take care of such out of alinement movement and to make these blocks more flexible and yielding, each block is recessed or cut away in its end faces as at 24.

With this arrangement, a universal joint is provided which requires no lubrication and all rattling or other noises due to contact of moving metal parts is eliminated due to the fact that the only metal to metal contact between the outer or driving member and the inner or driven member, is the shoes 21 which simply slide upon the flat surface of the abutment 20, they being firmly held at all times in contact with these abutments by the expansive force of the interposed rubber blocks. The strain and flexing action to which these rubber blocks are subjected is therefore reduced to a minimum and the length of life of the rubber is greatly increased. The construction of the metal parts is such as to greatly simplify their manufacture, the number of operations required in forming the several stampings being reduced to the minimum as all of these parts are duplicates and only one set of dies is required to form the required number of parts.

It is obvious that changes may be made in the form, construction and arrangement as shown, without departing from the spirit of the invention and I do not therefore limit myself to the particular construction shown.

Having thus fully described my invention what I claim is:

1. In a device of the character described, the combination of a driving member, a driven member, said members being provided with parts alternately arranged on said members and said members being free to move relatively in a longitudinal direction under end thrust, non-metallic yieldable blocks interposed between said alternately arranged parts and fixed relative to one of said members and movable relative to the other, whereby driving torque is transmitted by said blocks from said driving to said driven member and said members are free to move relatively under end thrust.

2. In a device of the character described, the combination of a driving member, a driven member, said members being arranged one within the other and free to move relatively in an endwise direction, abutments on said outer and inner driving and driven members arranged in alternate relation, yieldable means interposed between said abutments and fixed relative to the abutments on one member and movable relative to the abutments on the other member, whereby one of said members is free to move endwise under end thrust independently of said yieldable means.

3. In a device of the character described, the combination of a driving member and a driven member, one arranged within the other and free to move relatively in an endwise direction, said members having alternately arranged inwardly and outwardly extending parts, yieldable means secured to the inwardly extending parts on the outer member against movement longitudinally of said member and free to slide relative to the outwardly extending parts on the inner member, said yieldable means being interposed under compression between said inwardly extending parts on the outer member and said outwardly extending parts on the inner member.

4. In a device of the character described, the combination with a driving member and a driven member arranged, one within the other for free relative angular movement, of a plurality of yieldable non-metallic blocks carried by one of said members, anti-friction means interposed between said blocks and the other of said members to provide free relative sliding movement between one side of each of said blocks and the other of said members, said blocks and interposed means being arranged to transmit driving torque from one to the other of said driving and driven members.

5. In a device of the character described, the combination of a driving and a driven member arranged one within the other, said outer of said members having inwardly extending radial abutments and said inner of said members having outwardly extending radial abutments alternating with the abutments on the outer member, yieldable non-metallic members interposed between said abutments and connected to the abutments on one of said members, and a shoe on each yieldable member in sliding engagement with the face of an adjacent abutment on the other of said members.

6. In a device of the character described, the combination of a driving member and a driven member, one arranged within the other, the outer of said members being a tubular casing having inwardly extending radial abutments, and said inner of said members having outwardly extending radial abutments, rubber blocks connected to said abutments on said outer member to move therewith, and metallic shoes on said blocks to slidably engage said abutments on said inner member.

7. In a device of the character described, the combination of driving and driven members, said outer of said driving and driven members comprising a tubular casing formed of a plurality of segments, a plurality of inwardly extending radial abutments secured between the adjacent ends of said segments, said inner of said driving and driven members being formed with radial outwardly extending abutments alternating with said abutments on the outer member, and non-metallic yieldable blocks secured to the abutments on the outer member and movable therewith relative to the abutments on the inner member to permit longitudinal movement of said inner member relative to and independently of said outer member.

8. A universal joint including a tubular casing, an inner axial member, members extending radially inward from said casing and forming abutments, laterally extending flanges on said abutments, said inner members being formed with outwardly extending radial abutments alternating with the abutments on the casing, resilient non-metallic blocks inserted within and filling the spaces between said abutments and seated between said flanges on the abutments on the casing, said blocks being unrestrained by said abutments on said inner member, and abutments on said inner member being free to move longitudinally of the casing axis between said blocks when said casing and inner member are moved relatively by endwise thrust on said inner member, and means for yieldingly resisting endwise movement of said inner member.

9. A universal joint comprising a casing formed of a plurality of segmental parts, abutments on said casing formed of a pair of metal plates secured at their outer ends between adjacent ends of the several casing parts, an inner member comprising a plurality of like segmental parts each formed with outwardly extending wings forming abutments on said inner member, resilient non-metallic blocks under compression between said abutments, bearing members adapted to engage one side of said blocks and interposed between said blocks and the abutments on said inner member.

10. In a universal joint, the combination of an outer tubular member, an inner axial member, radially extending abutments on said members with the abutments on one member overlapping and alternating with and in spaced relation to those on the other member, laterally extending flanges on the abutments on one member, and resilient non-metallic blocks interposed between the abutments on one member and those on the other member with said blocks held against longitudinal movement relative to one member by said flanges, the abutments on the other member being free to move longitudinally between adjacent blocks.

In testimony whereof I affix my signature.

FREDERICK M. GUY.